United States Patent
Wei et al.

(10) Patent No.: US 9,926,981 B2
(45) Date of Patent: Mar. 27, 2018

(54) LABYRINTH SEAL BEARING

(71) Applicant: Schaeffler Technologies AG & Co. KG, Herzogenaurach (DE)

(72) Inventors: Lai Wei, Shanghai (CN); Caifen Liu, Shanghai (CN); Xin Liu, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/319,846

(22) PCT Filed: Apr. 3, 2015

(86) PCT No.: PCT/CN2015/075836
§ 371 (c)(1),
(2) Date: Dec. 19, 2016

(87) PCT Pub. No.: WO2016/000472
PCT Pub. Date: Jan. 7, 2016

(65) Prior Publication Data
US 2017/0152892 A1    Jun. 1, 2017

(30) Foreign Application Priority Data

Jul. 2, 2014    (CN) .......................... 2014 1 0313655

(51) Int. Cl.
*F16C 33/80*    (2006.01)
(52) U.S. Cl.
CPC .................................. *F16C 33/80* (2013.01)

(58) Field of Classification Search
CPC ..................................................... F16C 33/80
See application file for complete search history.

(56) References Cited

U.S. PATENT DOCUMENTS

| 4,093,324 A | 6/1978 | Carrigan |
| 4,770,424 A * | 9/1988 | Otto ........................ B61F 15/22 277/351 |
| 5,904,356 A * | 5/1999 | Mundy .................. F01D 11/003 277/417 |
| 6,722,657 B2 * | 4/2004 | Hood ................... F16J 15/3264 277/345 |

(Continued)

FOREIGN PATENT DOCUMENTS

| CN | 202182114 | 4/2012 |
| CN | 203023297 | 6/2013 |

(Continued)

*Primary Examiner* — Thomas R Hannon
(74) *Attorney, Agent, or Firm* — Volpe and Koenig, P.C.

(57) ABSTRACT

A labyrinth seal bearing includes: an inner ring; an outer ring; a labyrinth seal structure, located in a radial gap between the inner ring and the outer ring; wherein the labyrinth seal structure includes a plurality of seal rings, a labyrinth gap channel is formed among the plurality of seal rings, and the labyrinth gap channel includes two ports respectively connected with an external of the bearing and an internal of the bearing; and a seal loop made from lubricating grease, wherein the seal loop is located in the labyrinth gap channel, and blocks the labyrinth gap channel, so as to isolate the two ports from each other. The present disclosure solves the problem of poor sealing effect in a conventional labyrinth seal bearing.

10 Claims, 4 Drawing Sheets

(56) References Cited

U.S. PATENT DOCUMENTS

| | | | |
|---|---|---|---|
| 6,845,987 B2 * | 1/2005 | McCutchan | F16J 15/3448 277/411 |
| 8,342,535 B2 * | 1/2013 | Lattime | F16C 33/7813 277/409 |
| 2010/0244386 A1 * | 9/2010 | Horling | F16C 33/7806 277/417 |

FOREIGN PATENT DOCUMENTS

| | | |
|---|---|---|
| CN | 203214651 | 9/2013 |
| DE | 102011089770 | 6/2013 |

* cited by examiner

LABYRINTH SEAL BEARING

This application claims the benefit of priority to Chinese Patent Application No. 201410313655.4, titled "LABYRINTH SEAL BEARING", filed with the Chinese State Intellectual Property Office on Jul. 2, 2014, the entire disclosure of which is incorporated herein by reference.

FIELD OF THE INVENTION

The disclosure generally relates to bearing technical field, and more particularly, to a labyrinth seal bearing.

BACKGROUND

FIG. 1 schematically illustrates a partial cross section of an axial end of a conventional labyrinth seal bearing along an axial direction. As shown in FIG. 1, the bearing includes: an inner ring 1; an outer ring 2; and a labyrinth seal structure 3, located in a radial gap (not shown) between the inner ring 1 and the outer ring 2, wherein the bearing is sealed with the labyrinth seal structure at the axial end of the bearing.

The labyrinth seal structure 3 includes: a first seal ring 31, fixedly set with respect to the outer ring 2, wherein there is an clearance S1 between an inner periphery of the first seal ring 31 and the inner ring 1 along a radial direction; a second seal ring 32, including a first axial extension element 32b and a first radial extension element 32a, wherein the first axial extension element 32b extends along an axial direction and is fixed on an outer surface of the inner ring 1, the first radial extension element 32a extends from an end of the first axial extension element 32b along a radial outward direction; a third seal ring 33, fixedly set with respect to the first seal ring 31, including a second axial extension element 33b and a second radial extension element 33a, wherein the second axial extension element 33b extends along the axial direction, the second radial extension element 33a extends from an end of the second axial extension element 33b along a radial inward direction. The first radial extension element 32a is located between the first seal ring 31 and the second radial extension element 33a, there is a clearance (not shown) between the first radial extension element 32a and the second axial extension element 33b, and a clearance S2 between the second radial extension element 33a and the first axial extension element 32b.

A labyrinth gap channel G is formed among the first seal ring 31, the second seal ring 32 and the third seal ring 33. The clearance S1 between the first seal ring 31 and the inner ring 1, and the clearance S2 between the second radial extension element 33a and the first axial extension element 32b form two ports of the labyrinth gap channel G, wherein the two ports are communicated with each other. One port of the two ports is communicated with an internal of the bearing, and the other port of the two ports is communicated with an external of the bearing. Wherein the internal of the bearing refers to a space surrounded by the inner ring 1, the outer ring 2 and the labyrinth seal structure 3, and the external of the bearing refers to an external environment where the bearing locates.

A standard for evaluating the sealing effect of a bearing is: the ability to prevent environmental contamination from entering the bearing, and the ability to prevent leakage of lubricant in the bearing. However, a contactless seal is realized in the conventional labyrinth seal bearing, which will result in a poor sealing effect.

SUMMARY

The problem to be solved in the present invention is: the sealing performance of the conventional labyrinth seal bearing is not very good.

In order to solve the above problem, a labyrinth seal bearing is provided in the present invention. The labyrinth seal bearing includes: an inner ring; an outer ring; and a labyrinth seal structure, located in a radial gap between the inner ring and the outer ring; wherein the labyrinth seal structure includes a plurality of seal rings, a labyrinth gap channel is formed among the plurality of seal rings, and the labyrinth gap channel includes two ports respectively connected with an external of the bearing and an internal of the bearing; and a seal loop made from lubricating grease, wherein the seal loop is located in the labyrinth gap channel, and blocks the labyrinth gap channel, so as to isolate the two ports from each other.

In some embodiments, a grease injection through hole is configured on at least one of the plurality of seal rings for injection of the lubricating grease; and the labyrinth seal bearing further includes: a seal cover, configured to cover the grease injection through hole.

In some embodiments, the lubricating grease has a cone penetration less than or equal to 160, with a unit of 0.1 mm.

In some embodiments, the plurality of seal rings includes: a first seal ring, fixedly set with respect to the outer ring, where the first seal ring includes a first radial extension element extending along a radial direction, wherein there is a first clearance between the first radial extension element and the inner ring; a second seal ring, including a second axial extension element and a second radial extension element, wherein the second axial extension element extends along an axial direction and is fixed on an outer surface of the inner ring, and the second radial extension element extends from an end of the second axial extension element along a radial outward direction; a third seal ring, fixedly set with respect to the outer ring, wherein the third seal ring includes a third axial extension element and a third radial extension element, wherein the third axial extension element extends along the axial direction, the third radial extension element extends from an end of the third axial extension element along a radial inward direction, and there is a clearance between the third axial extension element and the outer ring along the radial direction; wherein the second radial extension element is located between the first radial extension element and the third radial extension element, there is a second clearance between the second radial extension element and the third axial extension element, and a third clearance between the third radial extension element and the second axial extension element; wherein the first clearance, the second clearance and the third clearance are spaced sequentially along an axial outward direction of the bearing, with the first clearance and the third clearance as the two ports of the labyrinth gap channel.

In some embodiments, the first seal ring further includes: a first axial extension element, extending from an inner periphery of the first radial extension element along an axial direction of the bearing away from the second seal ring, wherein there is a clearance between the first axial extension element and the inner ring along the radial direction.

In some embodiments, the plurality of seal rings further includes: a fourth seal ring, including a fourth axial extension element and a fourth radial extension element, wherein the fourth axial extension element extends along the axial direction and is fixed on an outer surface of the second axial extension element, the fourth radial extension element extends along the radial outward direction from an end of the fourth axial extension element, there is a clearance between the fourth axial extension element and the third radial extension element, and the fourth radial extension element is located at a side of the third radial extension element which is away from the second radial extension element; a fifth seal ring, located in the clearance between the outer ring and the third axial extension element, wherein the fifth seal ring is fixed on the third axial extension element and located outside the radial direction of the fourth radial extension element, the fifth seal ring forms a centrifugal seal together with an outer periphery of the fourth radial extension element.

In some embodiments, a bending element is configured on the fourth radial extension element, wherein the bending element is formed by bending a radial outer end of the fourth radial extension element towards the axial outward direction of the bearing to generate an acute angle; a radial clearance between the fifth seal ring and the bending element gradually decreases along the axial outward direction of the bearing.

In some embodiments, the fourth radial extension element includes a flow-guide side surface, wherein the flow-guide side surface is located at a side of the bending element which is away from the fifth seal ring, and an angle between the flow-guide side surface and an axis of the fourth seal ring is an acute angle.

Compared with the prior art, the present disclosure has the following advantages:

The two ports of the labyrinth gap channel are isolated from each other by the seal loop, even if there are environmental contamination entering the labyrinth gap channel from one of the two ports, where the labyrinth gap channel is connected with the external of the bearing, or even if there are lubricant in the bearing entering the labyrinth gap channel from the other one of the two ports, where the labyrinth gap channel is connected with the internal of the bearing, the seal loop can prevent the environmental contamination and the lubricant from moving forward in the labyrinth gap channel, and further to prevent the environmental contamination from entering the bearing and the leakage of the lubricant in the bearing. Therefore, the sealing effect of the labyrinth seal bearing is improved.

DETAILED DESCRIPTION OF THE PREFERRED EMBODIMENTS

The above described objectives and features and advantages of the present disclosure will become more apparent and readily understood by describing in detail the exemplary embodiments with reference to the accompanying drawings.

Figure 1:
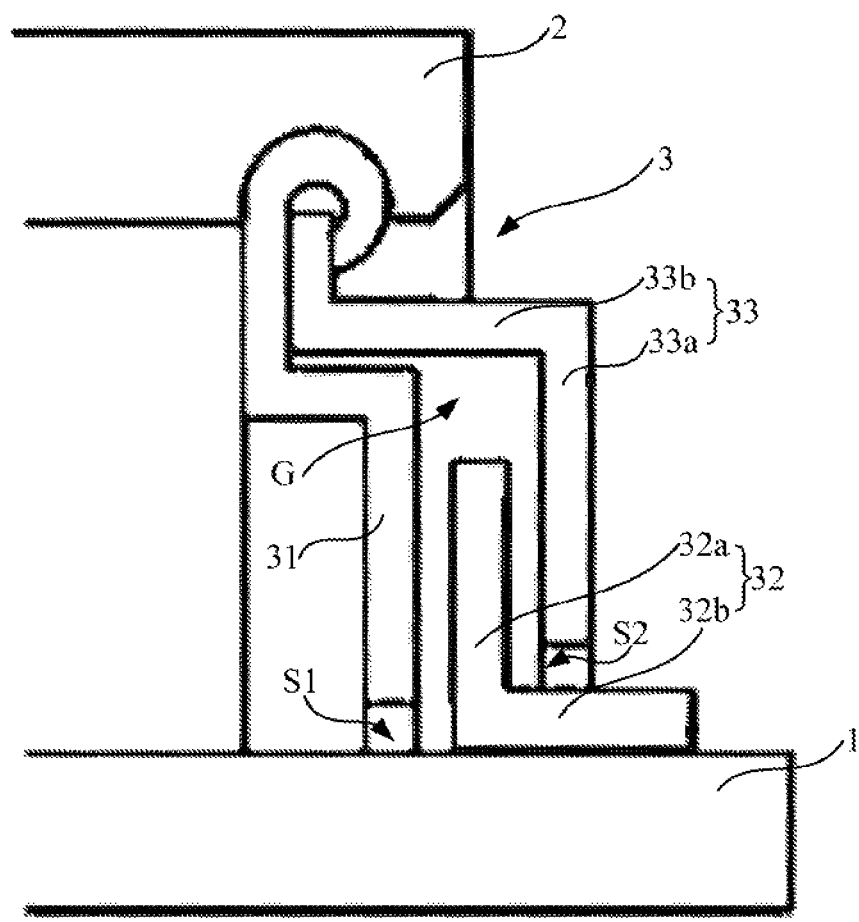
FIG. 1 schematically illustrates a partial cross section of an axial end of a conventional labyrinth seal bearing along an axial direction.
Figure 2:
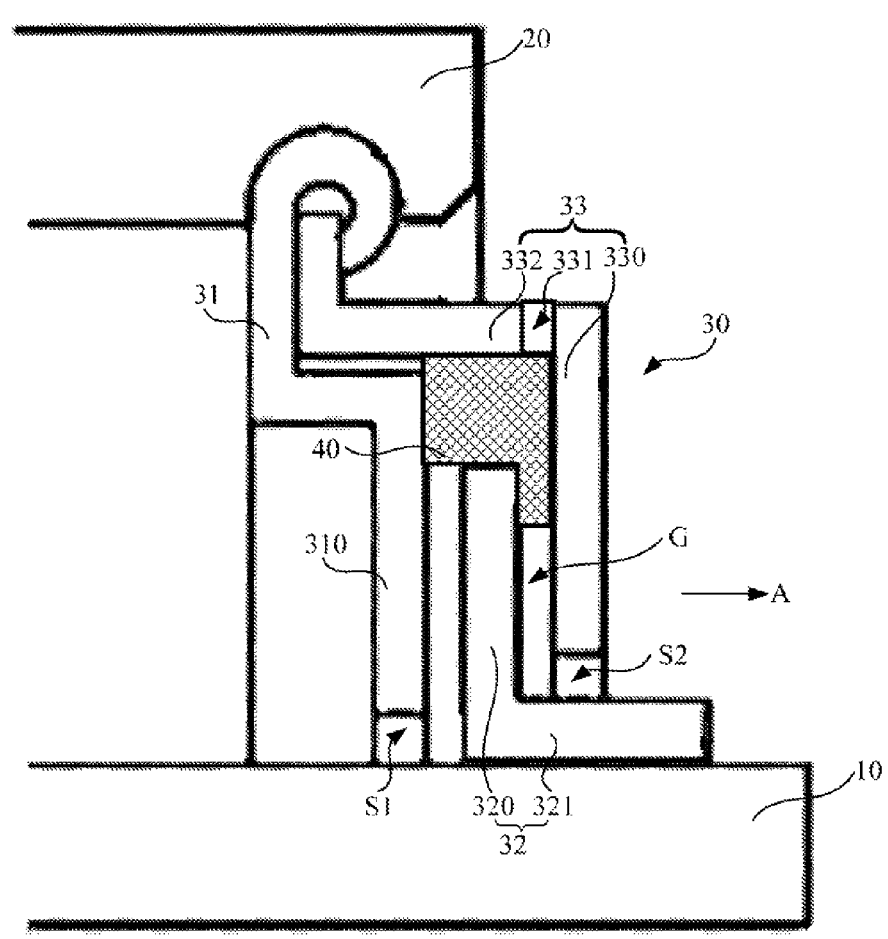
FIG. 2 schematically illustrates a partial cross section of an axial end of a labyrinth seal bearing along an axial direction according to a first embodiment of the present disclosure.

As shown in FIG. 2, a labyrinth seal bearing according to a first embodiment of the present disclosure includes: an inner ring 10; an outer ring 20; a labyrinth seal structure 30, located in a radial gap (not shown) between the inner ring 10 and the outer ring 20, wherein the labyrinth seal structure 30, the inner ring 10 and the outer ring 20 are coaxially arranged, and the bearing is sealed with the labyrinth seal structure 30 at an axial end of the bearing. The labyrinth seal structure 30 includes three seal rings, namely a first seal ring 31, a second seal ring 32, and a third ring 33 respectively. Wherein:

The first seal ring 31 is fixedly set with respect to the outer ring 20, and includes a first radial extension element 310 extending along a radial direction. There is a first clearance S1 between the first radial extension element 310 and the inner ring 10.

The second seal ring 32 includes a second axial extension element 321 and a second radial extension element 320, wherein the second axial extension element 321 extends along an axial direction and is fixed on an outer surface of the inner ring 10, and the second radial extension element 320 extends from an end of the second axial extension element 321 along a radial outward direction.

The third seal ring 33 is fixedly set with respect to the first seal ring 31 and includes a third axial extension element 332 and a third radial extension element 330, wherein the third axial extension element 332 extends along the axial direction, the third radial extension element 330 extends along a radial inward direction from an end of the third axial extension element 332, and there is a clearance between the third axial extension element 332 and the outer ring 20 along the radial direction.

The second radial extension element 320 is located between the first radial extension element 310 and the third radial extension element 330. There is a second clearance (not shown) between the second radial extension element 320 and the third axial extension element 332, and a third clearance S2 between the third radial extension element 330 and the second axial extension element 321.

The first clearance S1, the second clearance, and the third clearance S2 are spaced sequentially along an axial outward direction A of the bearing. Namely, in the axial direction of the bearing, the third clearance S2 is nearest to an external environment, while the first clearance S1 is farthest from the external environment.

A labyrinth gap channel G is formed among the first seal ring 31, the second seal ring 32 and the third seal ring 33, and the first clearance S1 between the first radial extension element 310 and the inner ring 10 serves as a first port where the labyrinth gap channel G is connected with an internal of the bearing, the third clearance S2 between the third radial extension element 330 and the second axial extension element 321 serves as a second port where the labyrinth gap channel G is connected with an external of the bearing.

In some embodiments, the third seal ring 33 is fixedly set with respect to the outer ring 20 by a fixation on the first seal ring 31. In other embodiments, the third seal ring 33 is directly fixed on the outer ring 20.

The labyrinth seal bearing further includes: a seal loop 40. The seal loop 40 is located in the labyrinth gap channel G and blocks the labyrinth gap channel G, so as to isolate the two ports of the labyrinth gap channel G from each other. In order to block the labyrinth gap channel G with the seal loop 40, and isolate the two ports from each other, the seal loop 40 needs to form a contact seal with at least three seal rings.

In some embodiments, the seal loop 40 forms the contact seal with the first seal ring 31, the second seal ring 32 and the third seal ring 33 respectively.

In some embodiments, the seal loop 40 has an L-shaped longitudinal section. That is, when the seal loop 40 is cut along the axial direction, a cross-section of the seal loop 40 is L-shaped. A radial inner end of the seal loop 40 is located between the second radial extension element 320 and the third radial extension element 330, and there is a clearance between the radial inner end and the second axial extension element 321 of the second seal ring 32, so that an axial clearance between the second radial extension element 320 and the third radial extension element 330 is not filled up with the seal loop 40. A radial outer end of the seal loop 40 is located between the second radial extension element 320 of the second seal ring 32 and the third axial extension element 332 of the third seal ring 33, and two ends of the seal loop 40 in the axial direction of the bearing respectively contact the first seal ring 31, and the third radial extension element 330 of the third seal ring 33.

Since the two ports of the labyrinth gap channel G are isolated from each other by the seal loop 40, even if there are environmental contamination entering the labyrinth gap channel G from the second port where the labyrinth gap channel G is connected with the external of the bearing, or lubricant in the bearing entering the labyrinth gap channel G from the first port where the labyrinth gap channel G is connected with the internal of the bearing, the seal loop 40 can prevent the environmental contamination and the lubricant from moving forward in the labyrinth gap channel G, and further to prevent the environmental contamination from entering the bearing and leakage of the lubricant in the bearing. Therefore, the sealing effect of the labyrinth seal bearing is improved.

In some embodiments, the lubricant applied in the labyrinth seal bearing is lubricating grease.

It's noted that, the shape of the first seal ring 31, the second seal ring 32 and the third seal ring 33 in the labyrinth seal structure 30 are not limited to the embodiments in the present disclosure, if only the first seal ring 31, the second seal ring 32 and the third seal ring 33 can form a labyrinth gap channel G to realize labyrinth seal on the bearing.

In addition, in the present disclosure, the number of the plurality of seal rings in the labyrinth seal structure 30 is not limited to three, if only the plurality of seal rings can form a labyrinth gap channel G to realize labyrinth seal on the bearing.

The seal loop 40 is made from lubricating grease, a grease injection through hole 331 is located on the third axial extension element 332 of the third seal ring 33 for injection of the lubricating grease that used to form the seal loop 40. The grease injection through hole 331 is aligned with the axial clearance between the second radial extension element 320 and the third radial extension element 330.

The labyrinth seal bearing further includes: a seal cover (not shown), configured to cover on the grease injection through hole 331.

In the present disclosure, the method to form the seal loop 40 by the lubricating grease includes the following: removing the seal cover on the grease injection through hole 331, injecting the lubricating grease into the labyrinth gap channel G from the grease injection through hole 331; after the injection of the grease injection, covering the seal cover on the grease injection through hole 331, and then rotating the labyrinth seal bearing, so that the lubricating grease in the labyrinth gap channel G can be spun off along the radial outward direction of the bearing under the effect of a centrifugal force, and adhere to the first seal ring 31, the second seal ring 32 and the third seal ring 33. With the rotation time of the labyrinth seal bearing increasing, more and more lubricating grease will adhere to the first seal ring 31, the second seal ring 32 and the third seal ring 33, until the seal loop 40 made from the lubricating grease forms the contact seal with the first seal ring 31, the second seal ring 32 and the third seal ring 33 respectively, so as to block the labyrinth gap channel G.

Although the contact seal is formed between the seal loop 40 and the plurality of seal rings (namely the first seal ring 31, the second seal ring 32 and the third seal ring 33) in the labyrinth seal structure 30, since a material of the seal loop 40 is lubricating grease, which makes a friction between the seal loop 40 and the plurality of seal rings small, there will not be much heat energy released during an operation of the bearing, nor any serious abrasion caused on the labyrinth seal structure 30. Therefore the operation lifetime of the bearing is prolonged.

In addition, even if the bearing is used for a period, the seal loop 40 will be consumed due to the friction between the seal loop 40 and the labyrinth seal structure 30, and a portion of lubricating grease in the seal loop 40 being spun off under the effect of the centrifugal force, then new lubricating grease can be injected into the labyrinth gap channel G again. Thus, in operation of the bearing, the new lubricating grease injected will be spun off along the radial outward direction under the effect of the centrifugal force, to make compensation for the consumed portion of the seal loop 40, so that the seal loop 40 can form a contact seal with the first seal ring 31, the second seal ring 32 and the third seal ring 33 all the time, to make sure the bearing has a good sealing effect.

Furthermore, even if the bearing is used for a period, a portion of lubricating grease in the seal loop 40 is spun off under the effect of the centrifugal force, the lubricating grease that is spun off will be mixed with the lubricating grease in the bearing that is used as lubricant, thus the lubrication effect of the bearing won't be influenced.

It's noted that, in order to form a contact seal among the seal loop 40, the first seal ring 31, the second seal ring 32 and the third seal ring 33, wherein the seal loop 40 is made from the lubricating grease injected into the labyrinth gap channel G, the lubricating grease that is injected into the labyrinth gap channel G cannot be too little. A specific injection quantity of the lubricating grease can be identified by experiment.

It should be further noted that, in order to avoid much lubricating grease in the seal loop 40 being spun off under the effect of the centrifugal force during operation of the bearing, and resulting in the seal loop 40 failing to form a contact seal with the first seal ring 31, the second seal ring 32 and the third seal ring 33, the lubricating grease applied to form the seal loop 40 need to have a larger consistence, wherein the consistence is larger than a consistence of the lubricating grease used in the bearing as a lubricant.

A large number studies suggested that, when the lubricating grease applied to form the seal loop 40 has a cone penetration (a scalar used to represent the consistence of the lubricating grease in the present invention) less than or equal to 160 (with a unit of 0.1 mm), after formation of the seal loop 40, the lubricating grease in the seal loop 40 is not likely to be spun off under the effect of the centrifugal force in operation of the bearing, so that the seal loop 40 can form a contact seal with the second seal ring 32, and the third seal ring 33 for a long time.

In some embodiments, lubricating grease has a consistence of five level or above can be applied to form the seal loop 40 in the present disclosure. Wherein, the lubricating grease with a consistence of five level has a cone penetration ranging from 130 to 160 (with a unit of 0.1 mm), the lubricating grease with a consistence of six level has a cone penetration ranging from 85 to 115 (with a unit of 0.1 mm).

Figure 3:
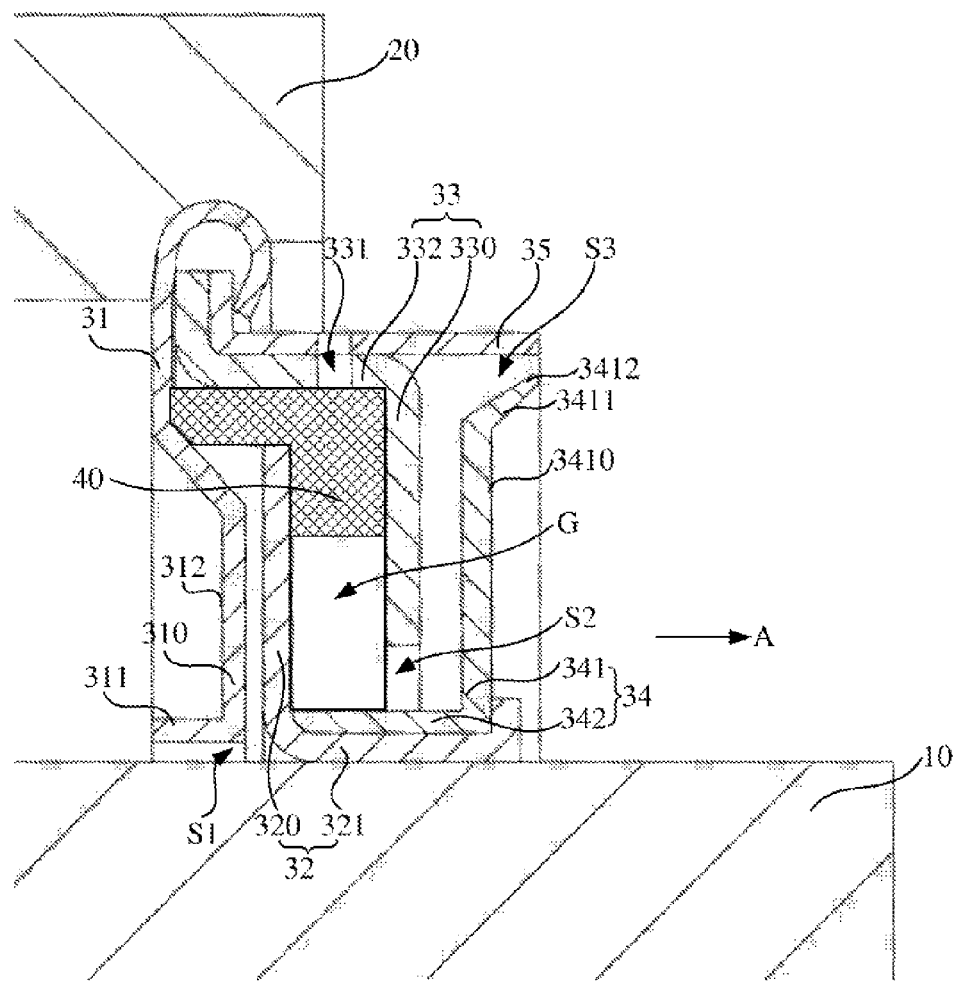
FIG. 3 schematically illustrates a partial cross section of an axial end of a labyrinth seal bearing along an axial direction according to a second embodiment of the present disclosure.

The difference between a second embodiment and the first embodiment lies in that, in the second embodiment, as shown in FIG. 3, the first seal ring 31 further includes: a first axial extension element 311, extending from an inner periphery of the first radial extension element 310 along an axial direction of the bearing away from the second seal ring 32, wherein there is a clearance (not shown) between the first axial extension element 311 and the inner ring 10 along the radial direction; the labyrinth seal structure further includes a fourth seal ring 34 and a fifth seal ring 35.

In operation of the bearing, the lubricant in the bearing is possible to be sputtered on a side surface 312 of the first seal ring 31 which is away from the second seal ring 32. As a result, in an upper part (shown in the Figure) of the bearing that is above the axis of the bearing along the radial direction, lubricant on the side surface 312 will flow to an outer peripheral surface of the first axial extension element 311 along the radial inward direction of the bearing due to gravity. Therefore, it's not easy for the lubricant to flow into the first clearance S1, and the leakage of the lubricant in the bearing is reduced.

Furthermore, even if there are some lubricant flowing into the clearance between the first axial extension element 311 and the inner ring 10, the first axial extension element 311 can also extend the leaking path of the lubricant. The lubricant can only enter the labyrinth gap channel G by passing through the radial clearance between the first axial extension element 311 and the inner ring 10. Therefore, it's not easy for the lubricant in the bearing to leak out.

The fourth seal ring 34 includes a fourth axial extension element 342 and a fourth radial extension element 341, wherein the fourth axial extension element 342 extends along the axial direction and is fixed on an outer surface of the second axial extension element, the fourth radial extension element 341 extends from an end of the fourth axial extension element 342 along the radial outward direction, there is a clearance between the fourth axial extension element 342 and the third radial extension element 330, and the fourth radial extension element 341 is located at a side of the third radial extension element 330 which is away from the second radial extension element 320.

The fifth seal ring 35 is located in the clearance between the outer ring 20 and the third axial extension element 332 and fixed on the third axial extension element 332, the fifth seal ring 35 is located outside the radial direction of the fourth radial extension element 341, and there is a clearance S3 between the fifth seal ring 35 and an outer periphery of the fourth radial extension element 341, the fifth seal ring 35 and the outer periphery of the fourth radial extension element 341 together form a centrifugal seal.

In the present disclosure, there is a through hole (not shown) located in a position on the fifth seal ring 35, wherein the position corresponds to the grease injection through hole 331, in order to form the seal loop 40 by injecting lubricating grease into the labyrinth gap channel G through the through hole and the grease injection through hole 331.

The leaking path of the lubricant in the bearing and the path of the environmental contamination entering the bearing can be prolonged by forming the fourth seal ring 34 and the fifth seal ring 35 in the labyrinth seal structure 30, and thus the sealing effect of the bearing is further improved.

In addition, even if there are environmental contamination entering a clearance between the fourth radial extension element 341 and the third radial extension element 330 from the radial clearance S3 between the fifth seal ring 35 and the fourth seal ring 34, the environmental contamination is likely to be spun off through the radial clearance S3 under the effect of the centrifugal force, to avoid the environmental contamination entering the bearing.

In some embodiments, there is a bending element 3412 located on the fourth radial extension element 341, wherein the bending element 3412 is formed by bending an radial outer end of the fourth radial extension element 341 towards an axial outward direction A of the bearing (namely an axial direction from the third radial extension element 330 to the fourth radial extension element 341) to generate an acute angle. A radial clearance S3 between the fifth seal ring 35 and the bending element 3412 gradually decreases along the axial outward direction A of the bearing. Thus, the radial clearance S3 is a convergent clearance along the axial outward direction A of the bearing, and the environmental contamination entering the clearance between the fourth radial extension element 341 and the third radial extension element 330 is more likely to be spun off through the radial clearance S3 under the effect of the centrifugal force, so as to acquire a better sealing effect.

In some embodiments, the fourth radial extension element 341 includes: an outer side surface 3410 away from the third seal ring 33 in the axial direction of the bearing; and a flow-guide side surface 3411, located on a side of the bending element 3412 away from the fifth seal ring 35. An angle between the flow-guide side surface 3411 and an axis of the fourth seal ring 34 is an acute angle, so that a vertical distance between the flow-guide side surface 3411 and the axis of the fourth seal ring 34 gradually increases along an axial outward direction A of the bearing.

In operation of the bearing, the environmental contamination (such as sewage) is possible to be sputtered on the outer side surface 3410 of the fourth radial extension element 341. In a lower part (not shown in FIG. 3, what is shown in FIG. 3 is the upper part of the bearing that is above the axis of the bearing along the radial direction) of the bearing that is below the axis of the bearing along the radial direction, the environmental contamination on the outer side surface 3410 will flow to the flow-guide side surface 3411 along the radial outward direction of the bearing due to gravity, and then depart from the bearing. Therefore, the environmental contamination is not likely to enter the radial clearance S3 between the fifth seal ring 35 and the fourth seal ring 34, nor enter the bearing, so as to acquire a better sealing effect.

Figure 4:
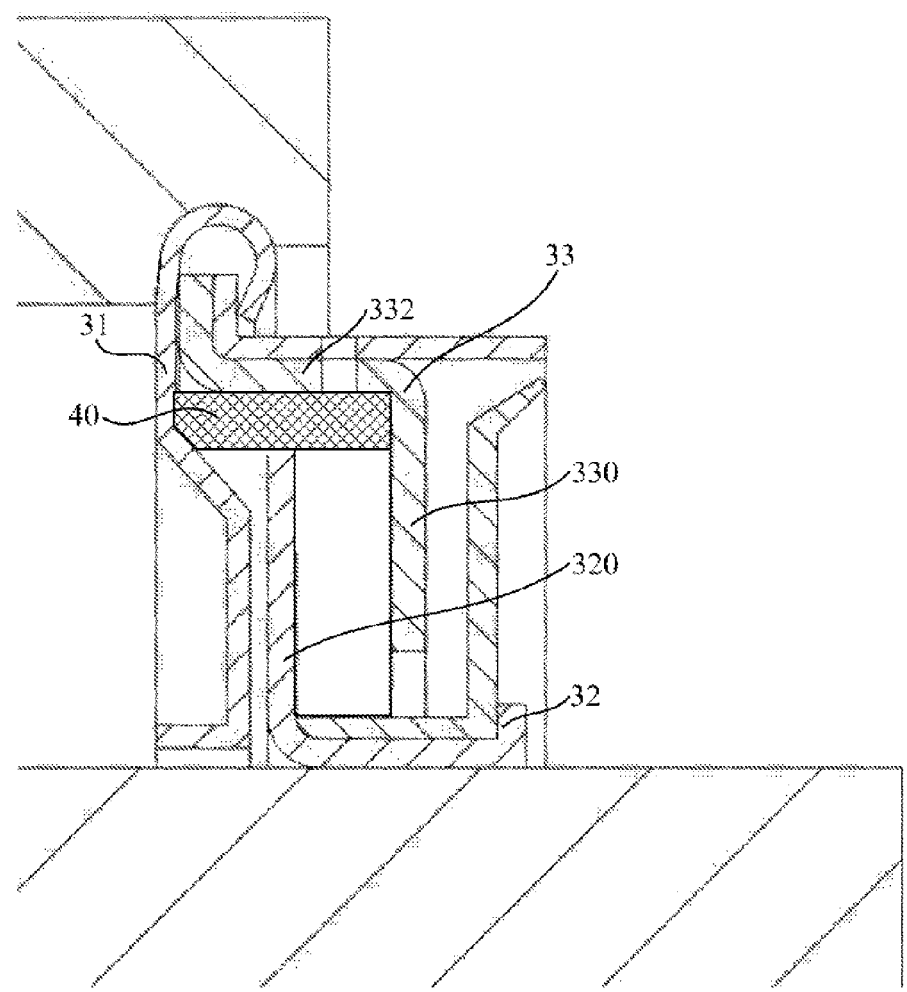
FIG. 4 schematically illustrates a partial cross section of an axial end of a labyrinth seal bearing along an axial direction according to a third embodiment of the present disclosure.

The difference between a third embodiment and the second embodiment lies in that: in the third embodiment, as shown in FIG. 4, the seal loop 40 has a longitudinal section with linear shape, that is, when the seal loop 40 is cut along the axial direction of the seal loop 40, a cross section of the seal loop 40 has a linear shape. The seal loop 40 is located between the second radial extension element 320 of the second seal ring 32 and the third axial extension element 332 of the third seal ring 33, wherein both two ends of the seal loop 40 along the axial direction of the bearing respectively contact the first seal ring 31, and the third radial extension element 330 of the third seal ring 33.

It's noted that, when a material of the seal loop is lubricating grease, a position of the grease injection through hole needs to be chosen according to a position of the seal loop in the labyrinth gap channel, so as to form the seal loop in a designated position in the labyrinth gap channel.

Furthermore, in the present disclosure, the shape of the seal loop, and the position of the seal loop in the labyrinth gap channel should not be limited to the above embodiments, and deformation can be made in other embodiments.

In the present disclosure, each embodiment is described in a progressive way, with the emphasis on the difference between the present embodiment and the aforementioned one, while the similarity between each embodiment can refer to the aforementioned embodiments.

The disclosure is disclosed, but not limited, by preferred embodiments as above. Based on the disclosure of the present invention, those skilled in the art can make any variation and modification without departing from the scope of the disclosure. Therefore, any simple modification, variation and polishing based on the embodiments described herein is within the scope of the present disclosure. The protection scope should refer to the claims of the present disclosure.

The invention claimed is:

1. A labyrinth seal bearing, comprising:
    an inner ring;
    an outer ring;
    a labyrinth seal structure located in a radial gap between the inner ring and the outer ring;
    the labyrinth seal structure comprises a plurality of seal rings, a labyrinth gap channel formed among the plurality of seal rings, and the labyrinth gap channel comprises two ports respectively connected with an external area from the bearing and an internal area of the bearing; and
    a seal loop made from lubricating grease located in the labyrinth gap channel that contacts three seal rings of the plurality of seal rings and blocks the labyrinth gap channel to isolate the two ports from each other.

2. The labyrinth seal bearing according to claim 1, further comprising a grease injection through hole configured on at least one of the plurality of seal rings for injection of the lubricating grease; and
    a seal cover configured to cover the grease injection through hole.

3. The labyrinth seal bearing according to claim 1, wherein the lubricating grease has a cone penetration less than or equal to 160, with a unit of 0.1 mm.

4. The labyrinth seal bearing according to claim 1, wherein the two ports consists of one radial extending port and one axial extending port.

5. The labyrinth seal bearing according to claim 1, wherein the seal loop contacts an axial face of at least one of the plurality of seal rings.

6. A labyrinth seal bearing, comprising:
    an inner ring;
    an outer ring;
    a labyrinth seal structure located in a radial gap between the inner ring and the outer ring;
    the labyrinth seal structure comprises a plurality of seal rings, a labyrinth gap channel formed among the plurality of seal rings, and the labyrinth gap channel comprises two ports respectively connected with an external area from the bearing and an internal area of the bearing; and
    a seal loop made from lubricating grease located in the labyrinth gap channel that blocks the labyrinth gap channel to isolate the two ports from each other, wherein the plurality of seal rings comprises:
        a first seal ring, fixedly set with respect to the outer ring, comprising a first radial extension element extending along a radial direction, wherein there is a first clearance between the first radial extension element and the inner ring;
        a second seal ring, comprising a second axial extension element and a second radial extension element, wherein the second axial extension element extends along an axial direction and is fixed on an outer surface of the inner ring, and the second radial extension element extends from an end of the second axial extension element along a radial outward direction;
        a third seal ring, fixedly set with respect to the outer ring, comprising a third axial extension element and a third radial extension element, wherein the third axial extension element extends along the axial direction, the third radial extension element extends along a radial inward direction from an end of the third axial extension element, and there is a clearance between the third axial extension element and the outer ring along the radial direction;
    wherein the second radial extension element is located between the first radial extension element and the third radial extension element, there is a second clearance between the second radial extension element and the third axial extension element, and a third clearance between the third radial extension element and the second axial extension element;
    wherein the first clearance, the second clearance and the third clearance are spaced sequentially along an axial outward direction of the bearing, with the first clearance and the third clearance as the two ports of the labyrinth gap channel.

7. The labyrinth seal bearing according to claim 6, wherein the first seal ring further comprises:
    a first axial extension element, extending from an inner periphery of the first radial extension element along an axial direction of the bearing away from the second seal ring, wherein there is a clearance between the first axial extension element and the inner ring along the radial direction.

8. The labyrinth seal bearing according to claim 6, wherein the plurality of seal rings further comprises:
    a fourth seal ring, comprising a fourth axial extension element and a fourth radial extension element, wherein the fourth axial extension element extends along the axial direction and is fixed on an outer surface of the second axial extension element, the fourth radial extension element extends from an end of the fourth axial extension element along the radial outward direction, there is a clearance between the fourth axial extension element and the third radial extension element, and the fourth radial extension element is located at a side of the third radial extension element which is away from the second radial extension element;
    a fifth seal ring, located in the clearance between the outer ring and the third axial extension element, wherein the fifth seal ring is fixed on the third axial extension element and located outside the radial direction of the fourth radial extension element, and the fifth seal ring forms a centrifugal seal together with an outer periphery of the fourth radial extension element.

9. The labyrinth seal bearing according to claim 8, wherein a bending element is configured on the fourth radial extension element, wherein the bending element is formed by bending an radial outer end of the fourth radial extension element towards the axial outward direction of the bearing to generate an acute angle;

a radial clearance between the fifth seal ring and the bending element gradually decreases along the axial outward direction of the bearing.

10. The labyrinth seal bearing according to claim 9, wherein the fourth radial extension element comprises a flow-guide side surface, wherein the flow-guide side surface is located at a side of the bending element which is away from the fifth seal ring, and an angle between the flow-guide side surface and an axis of the fourth seal ring is an acute angle.

\* \* \* \* \*